United States Patent
Kiyoshima et al.

(10) Patent No.: US 11,540,321 B2
(45) Date of Patent: Dec. 27, 2022

(54) RADIO BASE STATION AND COMMUNICATION CONTROL METHOD

(71) Applicant: NTT DOCOMO, INC., Tokyo (JP)

(72) Inventors: Kohei Kiyoshima, Tokyo (JP); Naoto Ookubo, Tokyo (JP); Anil Umesh, Tokyo (JP); Tooru Uchino, Tokyo (JP)

(73) Assignee: NTT DOCOMO, INC., Tokyo (JP)

( * ) Notice: Subject to any disclaimer, the term of this patent is extended or adjusted under 35 U.S.C. 154(b) by 733 days.

(21) Appl. No.: 16/087,550

(22) PCT Filed: Feb. 28, 2017

(86) PCT No.: PCT/JP2017/007776
§ 371 (c)(1),
(2) Date: Sep. 21, 2018

(87) PCT Pub. No.: WO2017/163784
PCT Pub. Date: Sep. 28, 2017

(65) Prior Publication Data
US 2021/0204325 A1    Jul. 1, 2021

(30) Foreign Application Priority Data
Mar. 24, 2016 (JP) .............................. JP2016-060449

(51) Int. Cl.
*H04W 74/08* (2009.01)
*H04W 68/02* (2009.01)
(Continued)

(52) U.S. Cl.
CPC ....... *H04W 74/0833* (2013.01); *H04W 68/02* (2013.01); *H04W 74/002* (2013.01); *H04W 88/085* (2013.01); *H04W 92/12* (2013.01)

(58) Field of Classification Search
CPC ............. H04W 74/0833; H04W 68/02; H04W 74/002; H04W 88/085; H04W 92/12; H04W 88/08; H04W 68/00; H04L 5/003
See application file for complete search history.

(56) References Cited

U.S. PATENT DOCUMENTS

2008/0014969 A1\* 1/2008 Laroia ................... H04W 68/00
455/458
2012/0207038 A1\* 8/2012 Choi ..................... H04W 16/14
370/252
(Continued)

FOREIGN PATENT DOCUMENTS

CN          103430469 A     12/2013
JP          2014-511170 A    5/2014
(Continued)

OTHER PUBLICATIONS

NTT DOCOMO, Inc.; "5G Vision for 2020 and Beyond"; 3GPP RAN workshop on 5G, RWS-150051; Phoenix, AZ, USA; Sep. 17-18, 2015 (23 pages).
(Continued)

*Primary Examiner* — Dinh Nguyen
(74) *Attorney, Agent, or Firm* — Osha Bergman Watanabe & Burton LLP

(57) ABSTRACT

One object is to provide a radio base station and a communication control method that can realize appropriate control on a user device even when a function of an upper layer such as MAC scheduler and a function of a radio physical layer are mounted separately. A communication control method according to the present invention is implemented in a radio base station (200) including a remote device (260) and a central aggregation device (210) and that performs radio communication with a user device (300). The communication control method includes transmitting including the central aggregation device (210) transmitting to the remote (Continued)

device (260) paging information that is information used for performing paging on the user device (300), and performing including the remote device (260) setting a downlink physical channel based on the paging information received from the central aggregation device (210) and performing the paging.

4 Claims, 9 Drawing Sheets

(51) Int. Cl.
*H04W 74/00* (2009.01)
*H04W 88/08* (2009.01)
*H04W 92/12* (2009.01)

(56) References Cited

U.S. PATENT DOCUMENTS

| | | | |
|---|---|---|---|
| 2013/0329686 A1 | 12/2013 | Kim et al. | |
| 2014/0126489 A1* | 5/2014 | Zakrzewski | H04W 72/1289 370/329 |
| 2014/0226481 A1* | 8/2014 | Dahod | H04W 36/0055 370/328 |
| 2014/0269547 A1 | 9/2014 | Valliappan et al. | |
| 2017/0156142 A1 | 6/2017 | Sato et al. | |

FOREIGN PATENT DOCUMENTS

| | | | | |
|---|---|---|---|---|
| WO | WO-2012111482 A1 * | 8/2012 | ............ | H04W 4/005 |
| WO | 2016/002166 A1 | 1/2016 | | |

OTHER PUBLICATIONS

International Search Report issued in PCT/JP2017/007776 dated May 23, 2017 (1 page).

Written Opinion issued in PCT/JP2017/007776 dated May 23, 2017 (3 pages).

Office Action issued in the counterpart European Patent Application No. 17769829.7, dated Oct. 23, 2019 (15 pages).

Office Action issued in Japanese Application No. 2018-507167; dated Feb. 16, 2021 (6 pages).

Extended European Search Report issued in the counterpart Japanese Patent Application No. 17769829.7, dated Jan. 28, 2020 (13 pages).

Office Action issued in Chinese Application No. 201780019265.8, dated May 20, 2021 (27 pages).

Office Action in counterpart Japanese Patent Application No. 2018-507167 dated Nov. 2, 2021 (4 pages).

Office Action in counterpart Chinese Patent Application No. 201780019265.8 dated Nov. 30, 2021 (26 pages).

Office Action in counterpart Japanese Patent Application No. 2018-507167 dated Mar. 15, 2022 (6 pages).

* cited by examiner

RADIO BASE STATION AND COMMUNICATION CONTROL METHOD

TECHNICAL FIELD

The present invention relates to a radio base station including a remote device and a central aggregation device and that performs radio communication with a user device, and to a communication control method.

BACKGROUND ART

3rd Generation Partnership Project (3GPP) specifies, with the aim of further speeding Long Term Evolution (LTE), LTE-Advanced (hereinbelow, the LTE includes the LTE-Advanced). Moreover, in the 3GPP, specification of succeeding systems of the LTE called 5G (5th generation mobile communication system) and the like is being considered.

So-called C-RAN radio base station including a central aggregation device having a scheduler function (MAC scheduler) in MAC layer, and the like and a remote device arranged at a remote installation site from the central aggregation device is used in the LTE. The remote device includes a radio unit (RF unit) such as PA (Power Amplifier)/LNA (Low Noise Amplifier), a radio transmission—reception module, and a modulation—demodulation module.

The central aggregation device and the remote device are connected to each other by a wired transmission path called a front-haul. For example, Common Public Radio Interface (CPRI) is known as an interface between the central aggregation device and the remote device.

On the occasion of consideration of the specification of the 5G, it is proposed (for example, see Non-Patent Document 1) to mount the function of a radio physical layer (layer 1) in the remote device that used to be mounted in the central aggregation device until now. When the function of the radio physical layer is mounted in the remote device, required transmission band for the front-haul can be reduced.

PRIOR ART DOCUMENT

Not-Patent Document

[Non-Patent Document 1]: 3GPP RWS-150051 (3GPP RAN workshop on 5G), "5G Vision for 2020 and Beyond," 3GPP, September, 2015

SUMMARY OF THE INVENTION

As mentioned above, the following issues arise when the function of the radio physical layer, which used to be mounted in the central aggregation device until now, is mounted in the remote device. That is, the function of an upper layer (layer 2, and the like) such as the MAC scheduler is mounted in the central aggregation device in the same manner as before. Therefore, for example, to process the radio physical layer in the remote device, it is necessary to notify the remote device of control information of radio resource assignment in the central aggregation device and control information of the user device, specifically, control information about paging and random access procedure (RA procedure).

However, if the function of the upper layer such as the MAC scheduler is mounted in the central aggregation device in the same manner as before and the function of the radio physical layer is mounted separately in the remote device, the cooperation between the radio physical layer and the upper layer of the radio physical layer becomes difficult.

The present invention has been made in view of the above discussion. One object of the present invention is to provide a radio base station and a communication control method that can realize appropriate control on a user device even when the function of the upper layer such as the MAC scheduler and the function of the radio physical layer are mounted separately.

According to one aspect of the present invention, in a radio base station including a remote device and a central aggregation device and that performs radio communication with a user device, the central aggregation device includes an information transmitting unit that transmits to the remote device paging information that is information used for performing paging on the user device, and the remote device includes an information receiving unit that receives the paging information; and a paging executing unit that sets a downlink physical channel based on the paging information received by the information receiving unit and performs the paging.

According to another aspect of the present invention, in a radio base station including a remote device and a central aggregation device and that performs radio communication with a user device, the central aggregation device includes an information transmitting unit that transmits to the remote device random access information that is information used for transmitting a random access response to the user device, and the remote device includes an information receiving unit that receives the random access information; and a response transmitting unit that sets a downlink physical channel based on the random access information received by the information receiving unit and transmits the random access response to the user device.

According to still another aspect of the present invention, a communication control method implemented in a radio base station including a remote device and a central aggregation device and that performs radio communication with a user device includes transmitting including the central aggregation device transmitting to the remote device paging information that is information used for performing paging on the user device; and performing including the remote device setting a downlink physical channel based on the paging information received from the central aggregation device and performing the paging.

According to still another aspect of the present invention, a communication control method implemented in a radio base station including a remote device and a central aggregation device and that performs radio communication with a user device includes transmitting including the central aggregation device transmitting to the remote device random access information that is information used for transmitting a random access response to the user device; and performing including the remote device setting a downlink physical channel based on the random access information received from the central aggregation device and transmitting the random access response to the user device.

MODES FOR CARRYING OUT THE INVENTION

Figure 1:
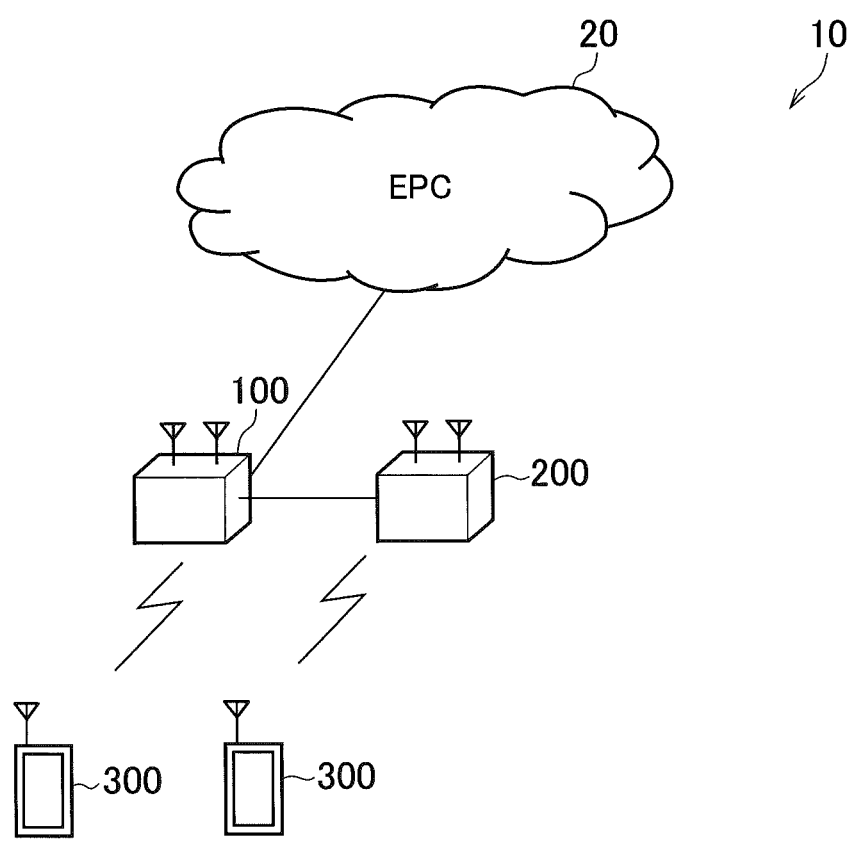
FIG. 1 is an overall structural diagram of a radio communication system 10.

Exemplary embodiments are explained below with reference to the accompanying drawings. In the drawings, structural elements having the same function or configuration are indicated by the same or similar reference numerals and the explanation thereof is appropriately omitted.

(1) Overall Structural Configuration of Radio Communication System

FIG. 1 is an overall structural diagram of a radio communication system 10 according to the present embodiment. The radio communication system 10 is a radio communication system in accordance with Long Term Evolution (LTE), and 5G which is a succeeding system of the LTE.

In the present embodiment, the LTE (including LTE-Advanced) will be appropriately called "4G" to show the correspondence thereof with the 5G. Moreover, in the present embodiment, a radio communication system having a configuration that is right after the 5G was introduced is assumed, and LTE assisted operation in which the 5G assists the 4G is realized.

The radio communication system 10 includes a core network 20, a radio base station 100, a radio base station 200, and one or more user devices 300.

The core network 20 is also called Evolved Packet Core (EPC) and is constituted by a mobility management entity (MME), a serving gateway (S-GW), PDN gateway (P-GW), and the like.

The radio base station 100 is a radio base station in accordance with the 4G and is also called eNodeB. The radio base station 100 is connected to a device (node) constituting the core network 20 via S1-MME or S1-U interface.

The radio base station 200 is a radio base station in accordance with the 5G. The radio base station 200 is connected to the radio base station 100 via X2 interface (below conveniently refers to as X2-AP', X2-U').

The user device 300 can perform radio communication with the radio base station 100 and the radio base station 200. The user device 300 may be called a radio communication terminal or a mobile station. The radio base station 200 and the user device 300 can be caused to support, by controlling a radio signal transmitted by a plurality of antenna elements, Massive MIMO that generates a beam having higher directivity, carrier aggregation (CA) that uses a plurality of component carriers (CC), dual connectivity (DC) in which a component carrier is transmitted at the same time between a plurality of radio base stations and the user device 300, and the like.

Figure 2:
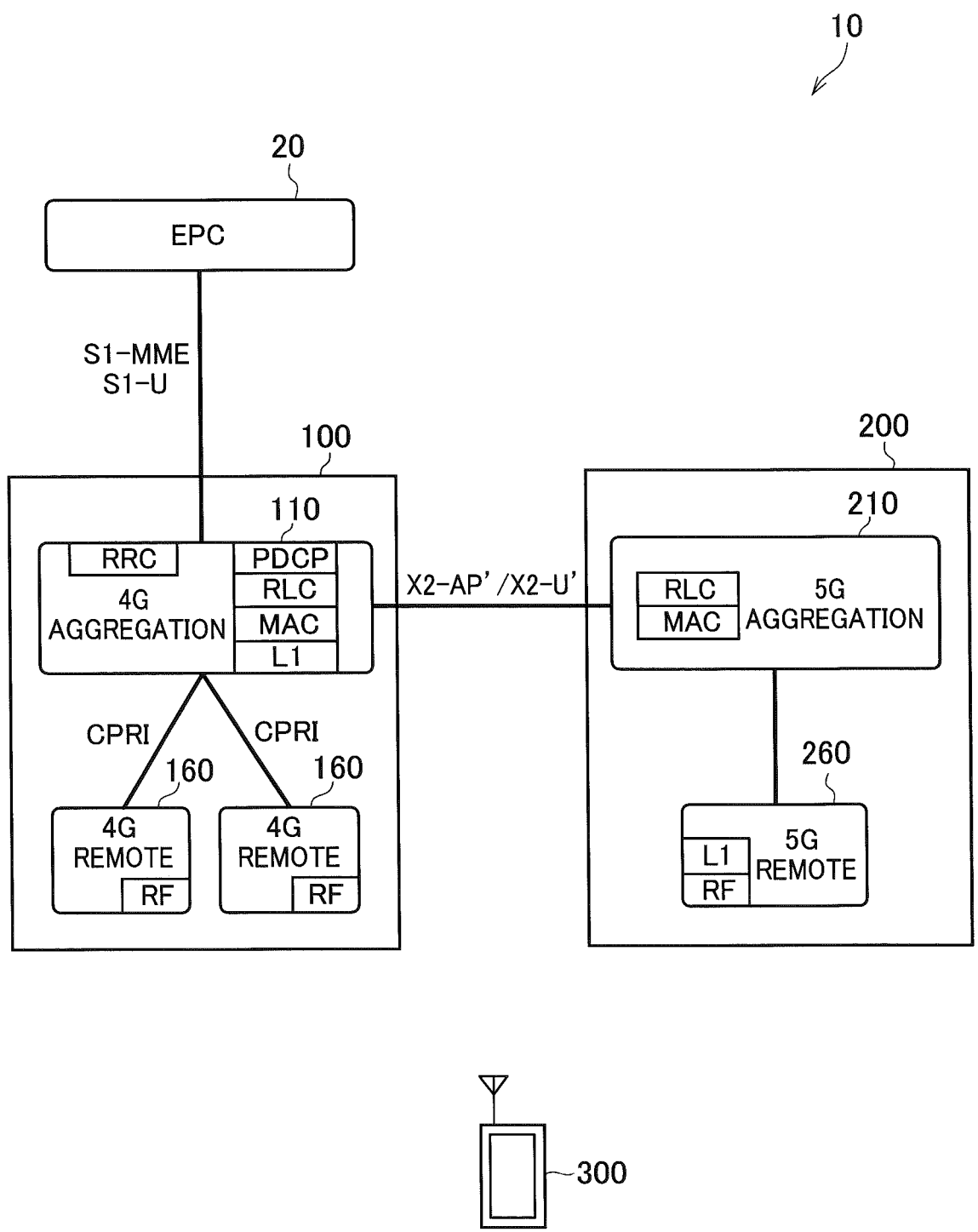
FIG. 2 is an overall block diagram of the radio communication system 10.

FIG. 2 is an overall block diagram of the radio communication system 10. As shown in FIG. 2, the radio base station 100 includes a central aggregation device 110 and one or more remote devices 160. The radio base station 200 includes a central aggregation device 210 and a remote device 260. It is allowable that each of the radio base station 100 and the radio base station 200 includes some device other than the central aggregation device and the remote device.

The central aggregation device 110 includes a radio physical layer (L1), a medium access control layer (MAC), a radio link control layer (RLC), and a packet data convergence protocol layer (PDCP). Moreover, the central aggregation device 110 includes a radio resource control layer (RRC) as an upper layer of the PDCP.

The remote device 160 can be installed at a site that is remote from the central aggregation device 110. The remote device 160 includes a radio unit (RF unit) such as the PA (Power Amplifier)/LNA (Low Noise Amplifier), a radio transmission—reception module, and a modulation—demodulation module.

The central aggregation device 110 is also called a digital processing unit (Digital Unit (DU)), and the remote device 160 is also called a radio processing unit (Radio Unit (RU)). The central aggregation device 110 and the remote device 160 are connected to each other via a wired transmission path called a front-haul. For example, the Common Public Radio Interface (CPRI) is used as an interface between the central aggregation device 110 and the remote device 160.

Although the central aggregation device 210 and the remote device 260 respectively correspond to the central aggregation device 110 and the remote device 160, the layer configurations thereof are different.

Specifically, the central aggregation device 210 includes the medium access control layer (MAC) and the radio link control layer (RLC). The remote device 260 includes the radio physical layer (L1) and the radio unit (RF).

As described above, the central aggregation device 210 is connected to the central aggregation device 110 via X2-AP', X2-U' interface.

(2) Functional Block Configuration of Radio Communication System

Specifically, functional block configurations of the central aggregation device 210 and the remote device 260 are explained.

(2.1) Central Aggregation Device 210

Figure 3:
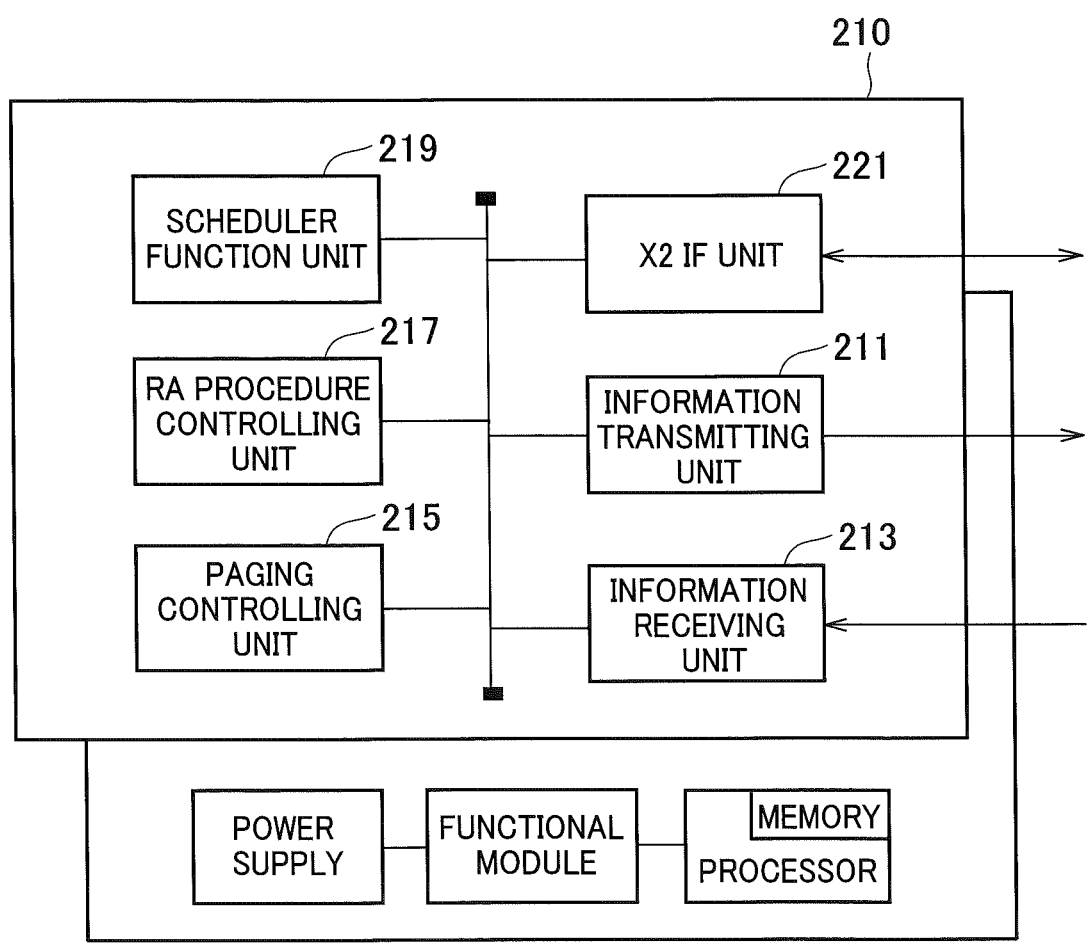
FIG. 3 is a functional block diagram of a central aggregation device 210.

FIG. 3 is a functional block diagram of the central aggregation device 210. As shown in FIG. 3, the central aggregation device 210 includes an information transmitting unit 211, an information receiving unit 213, a paging controlling unit 215, RA procedure controlling unit 217, a scheduler function unit 219, and X2 IF unit 221.

As shown in FIG. 3, each functional block of the central aggregation device 210 is implemented by hardware elements such as a processor (including a memory), a functional module (external connection IF and the like) and a power supply.

The information transmitting unit 211 transmits to the remote device 260 control information and the like necessary for performing radio communication with the user device 300. Specifically, the information transmitting unit 211 transmits to the remote device 260 scheduling information and the like. The scheduling information contains UL Grant and the like that is scheduling information of the radio resource (various channels and the like) for uplink from the user device 300 to the radio base station 200.

The UL Grant contains, as prescribed in 3GPP TS36.213 Chapter 6.2 and the like, Hopping flag (indicating presence or absence of frequency hopping of Msg3), Fixed size resource block assignment (indicating a transmission RB position and RB number of the Msg3), Truncated modulation and coding scheme (indicating MCS of the Msg3), TPC command for scheduled PUSCH (command for transmission power adjustment of UL), UL delay (used for transmission timing adjustment of the Msg3), and CSI request (indicating presence or absence of notice of DL quality (Channel state information) in the Msg3).

The information transmitting unit 211 transmits to the remote device 260 paging information that is information used for performing the paging (call) on the user device 300. Specifically, the information transmitting unit 211 can transmit as the paging information a transport block (TB) in itself of the paging information transmitted via a downlink physical channel (PDSCH: Physical Downlink Shared Channel).

Alternatively, the information transmitting unit 211 can transmit as the paging information contents of a paging message contained in the transport block of the paging information transmitted via the downlink physical channel. A configuration of the transport block of the paging information transmitted via the PDSCH will be explained later.

The information transmitting unit 211 transmits to the remote device 260 random access information that is information used for transmitting a random access response (RAR) to the user device 300. Specifically, the information transmitting unit 211 can transmit as the random access information the transport block in itself of the random access information transmitted by the downlink physical channel (PDSCH).

Alternatively, the information transmitting unit 211 can transmit as the random access information contents of an information element constituting the transport block of the random access information transmitted via the downlink physical channel. A configuration of the transport block of the random access information transmitted via the PDSCH will be explained later.

The information receiving unit 213 receives the information transmitted from the remote device 260. Specifically, the information receiving unit 213 can receive information required for a transmission power control (TPC) of an uplink signal transmitted from the user device 300 and channel quality information, specifically, CQI (Channel Quality Indicator), and the like.

The paging controlling unit 215 controls the paging on the user device 300. Specifically, the paging controlling unit 215 controls the paging (call) on the user device 300 to notify of an incoming message to the user device 300 that is in an idle state or to notify of a change of notification information to the user device 300.

More specifically, based on the contents of a paging request the paging controlling unit 215 generates the paging information to be transmitted by the information transmitting unit 211.

The RA procedure controlling unit 217 controls a random access procedure to be performed with the user device 300. Specifically, the RA procedure controlling unit 217 performs control to receive RA Preamble from the user device 300 and to transmit RA Response (random access response), which is a response to the RA Preamble, to the user device 300.

More specifically, based on the RA Preamble the RA procedure controlling unit 217 generates the random access information to be transmitted by the information transmitting unit 211.

The RA Preamble is a randomly selected preamble and it is transmitted via a physical random access channel (PRACH). The RA Response is a response to the reception of the RA Preamble. The RA Response contains Temporary C-RNTI, the UL Grant (assignment information about a radio resource for uplink transmission), and transmission timing information (Timing Advance command), and the like. Upon receiving the RA Response, based on the information included in the RA Response the user device 300 transmits a connection request (RRC Connection Request) to the radio base station 200.

The scheduler function unit 219 performs scheduling (assignment) of the radio resource to the user device 300 based on a status of each of a plurality of user devices 300 connected to the radio base station 200, a request from each of the user devices 300, and the like.

The X2 IF unit 221 provides an interface for realizing communication with the central aggregation device 110. Specifically, the X2 IF unit 221 is an interface that directly connects the central aggregation device 110 and the central aggregation device 210 by using the MAC and the RLC. It is preferable that the X2 IF unit 221 is an existing open interface. Data transmitted and received by the user device 300 is relayed to the radio base station 100 via the X2 IF unit 221.

(2.2) Remote Device 260

Figure 4:
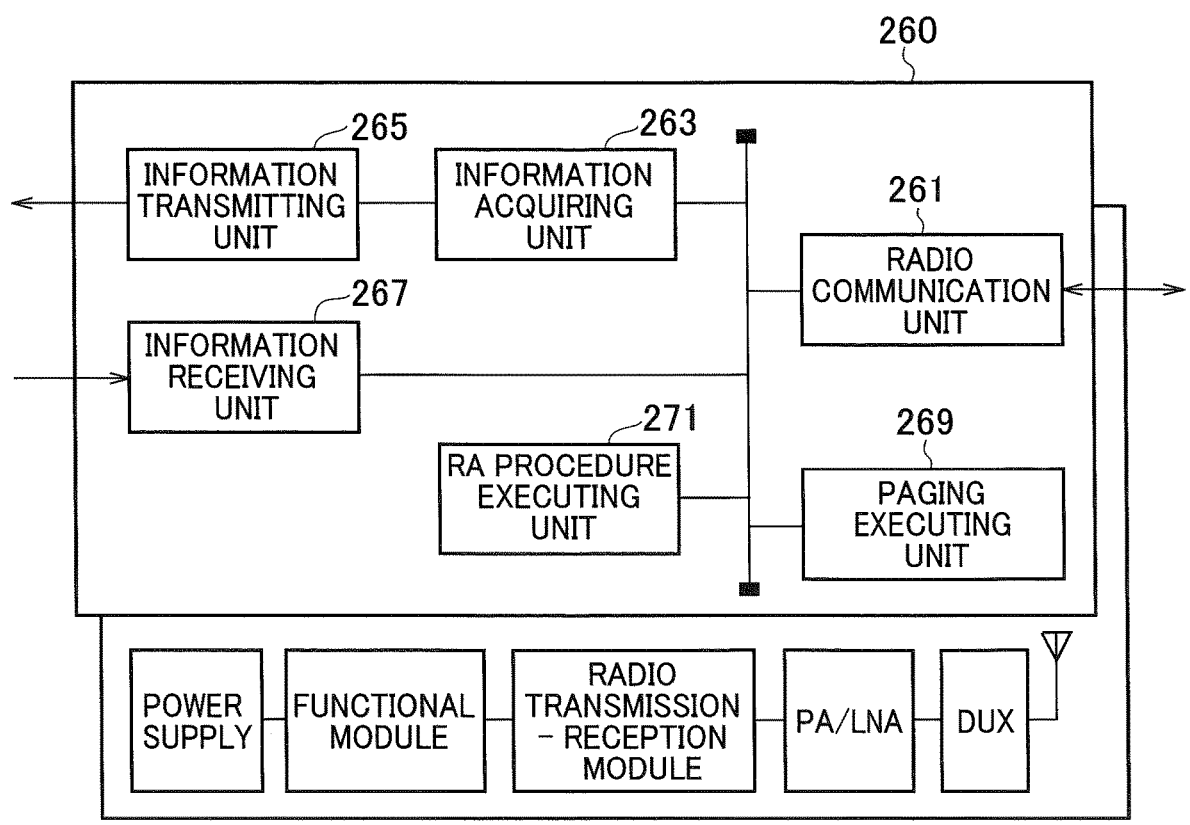
FIG. 4 is a functional block diagram of a remote device 260.

FIG. 4 is a functional block diagram of the remote device 260. As shown in FIG. 4, the remote device 260 includes a radio communication unit 261, an information acquiring unit 263, an information transmitting unit 265, an information receiving unit 267, a paging executing unit 269, and RA procedure executing unit 271.

As shown in FIG. 4, each functional block of the remote device 260 is implemented by hardware elements such as a duplexer, the PA (Power Amplifier)/LNA (Low Noise Amplifier), a radio transmission—reception module (RF conversion), a functional module (quadrature modulation and demodulation and the like) and a power supply.

The radio communication unit 261 performs radio communication with the user device 300. Specifically, the radio communication unit 261 performs the radio communication with the user device 300 according to the specification of the 5G. As mentioned earlier, the radio communication unit 261 can support the Massive MIMO, the carrier aggregation (CA), the dual connectivity (DC), and the like.

The information acquiring unit 263 acquires information transmitted by the user device 300. Particularly, in the present embodiment, the information acquiring unit 263 acquires the RA Preamble transmitted by the user device 300, the contents of the connection request (RRC Connection Request), and the like. The information acquiring unit 263 acquires the contents of the response to the paging on the user device 300, and the like. The information transmitting unit 265 transmits the information acquired by the information acquiring unit 263 to the central aggregation device 210.

The information receiving unit 267 receives the information transmitted from the central aggregation device 210. Specifically, the information receiving unit 267 receives the paging information transmitted from the central aggregation device 210. Moreover, the information receiving unit 267 receives the random access information transmitted from the central aggregation device 210.

The paging executing unit 269 performs paging on the user device 300. Specifically, based on the paging information received by the information receiving unit 267 the paging executing unit 269 sets a downlink physical channel (PDSCH) and performs the paging.

Based on the random access information received by the information receiving unit 267 the RA procedure executing unit 271 sets a downlink physical channel (PDSCH), and transmits the RA Response (random access response) to the user device 300. In the present embodiment, the RA procedure executing unit 271 constitutes a response transmitting unit.

(3) Operation of Radio Communication System

An operation of the radio communication system 10 is explained below. Specifically, a paging operation performed by the radio base station 200 on the user device 300, and an execution operation of the random access (RA) procedure performed by the radio base station 200 and the user device 300 are explained below.

(3.1) Outline of Operation

Figure 5:
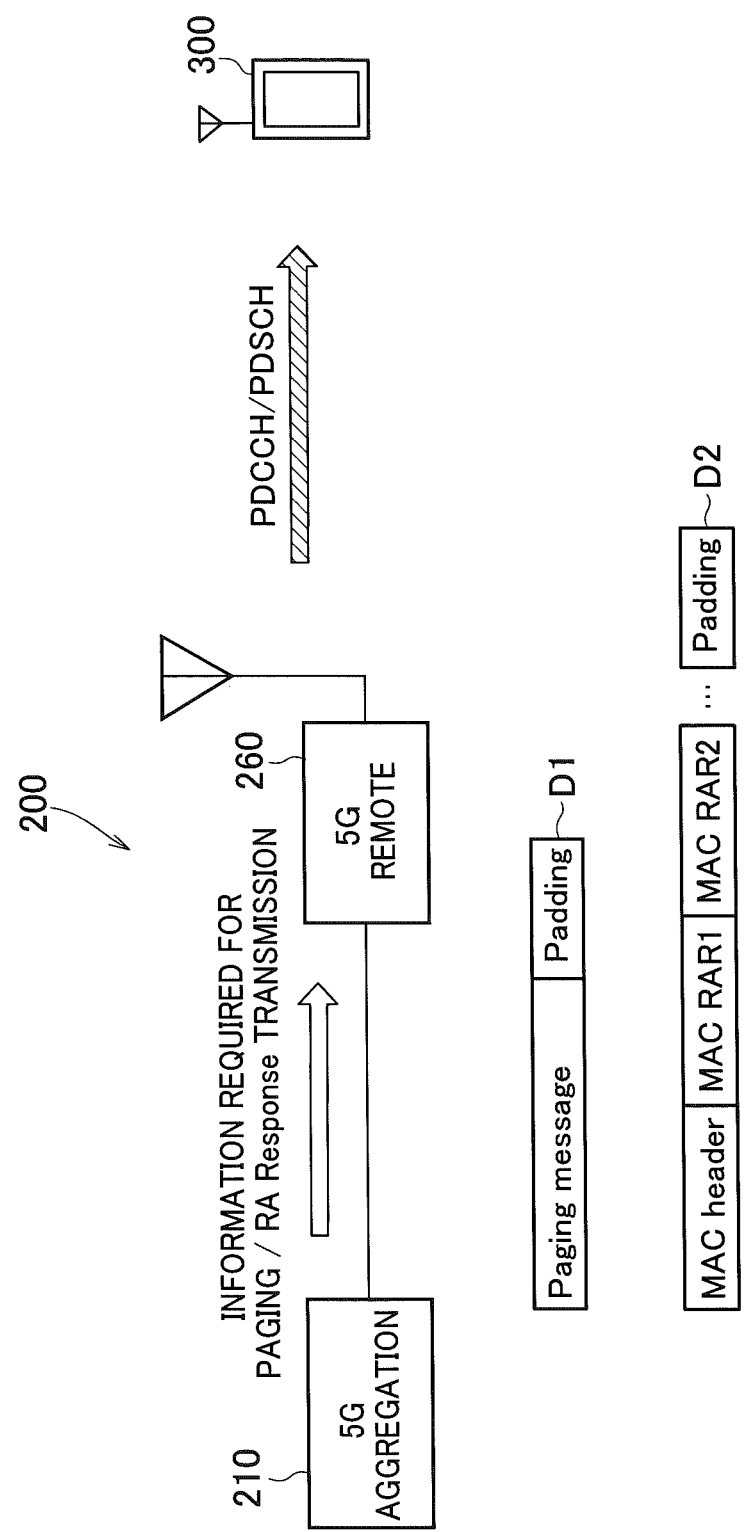
FIG. 5 is a view for explaining a concept of paging and a random access procedure by the central aggregation device 210, the remote device 260, and a user device 300.

FIG. 5 is a view for explaining a concept of the paging and the random access procedure performed by the central aggregation device 210, the remote device 260, and the user device 300.

As shown in FIG. 5, the central aggregation device 210 transmits to the remote device 260 the information that is required for the paging or for transmitting the RA Response. Specifically, as explained above, the central aggregation device 210 transmits paging information D1 or random access information D2 to the remote device 260.

The paging information D1 contains a paging message and a padding bit. The random access information D2 contains MAC header, RA Response (RAR) for each of a plurality of user devices (UE), and a padding bit. Details about the paging information D1 and the random access information D2 will be given later.

The remote device 260 transmits PDCCH (Physical Downlink Control Channel) or the PDSCH based on the paging information D1 or the random access information D2 received from the central aggregation device 210.

(3.2) Paging Operation

Figure 6:
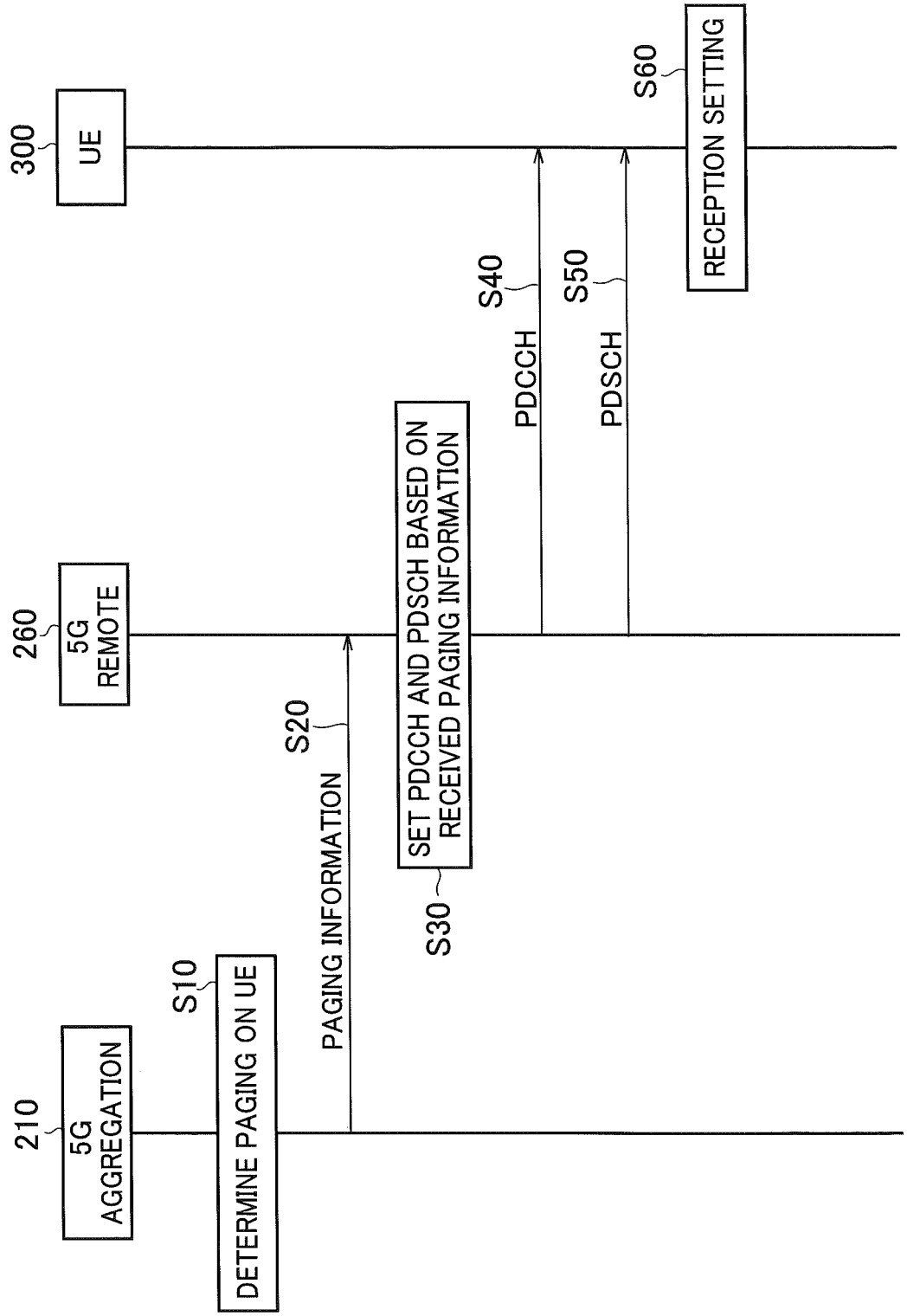
FIG. 6 depicts a sequence of the paging by the central aggregation device 210, the remote device 260, and the user device 300.

FIG. 6 depicts a sequence of the paging by the central aggregation device 210, the remote device 260, and the user device 300. As shown in FIG. 6, the central aggregation device 210 determines to perform the paging on the user device 300 (S10). Specifically, based on a request from the core network 20 the central aggregation device 210 determines to perform the paging to notify of an incoming message to the user device 300 that is in an idle state or to notify of a change of the notification information to the user device 300.

Having determined to perform the paging on the user device 300, the central aggregation device 210 transmits the paging information to the remote device 260 (S20). The contents of the paging information will be explained later.

Based on the paging information received from the central aggregation device 210 the remote device 260 performs the setting of the PDCCH and the PDSCH that are required for performing the paging (S30).

Furthermore, the remote device 260 transmits the PDCCH that contains information indicating existence of the paging on a particular user device 300 (S40). Moreover, the remote device 260 transmits the PDSCH containing the paging message to the particular user device 300 (S50).

The user device 300 targeted for the paging and that received the PDCCH and the PDSCH performs reception setting based on the received paging message (S60).

Figure 7:
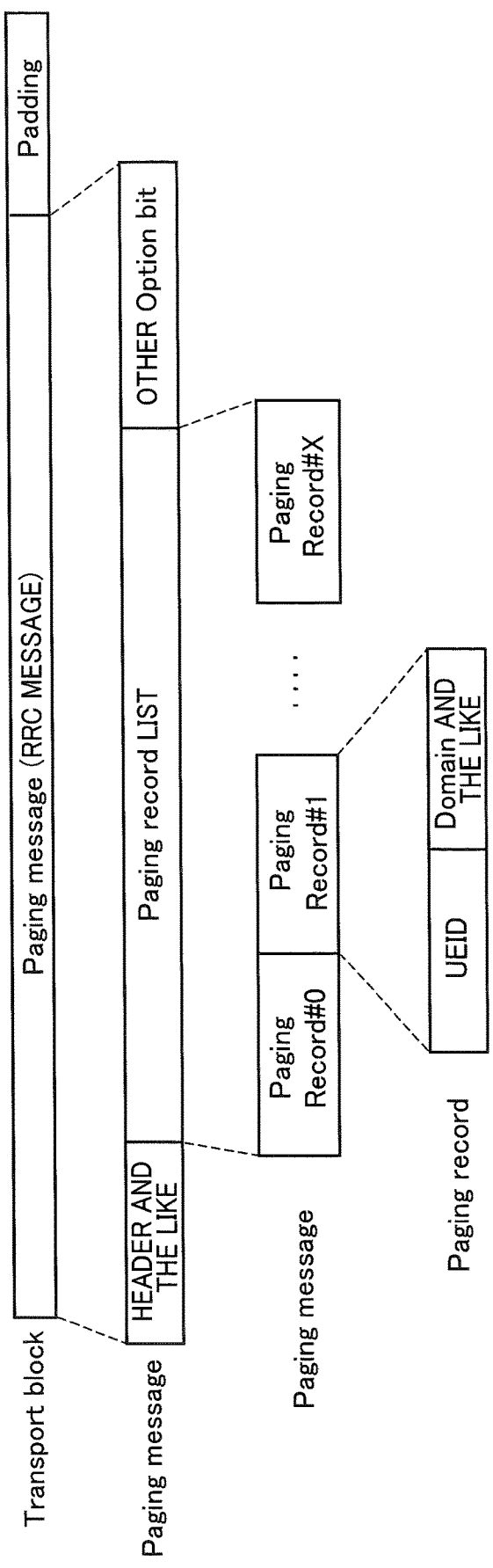
FIG. 7 depicts a configuration example of a transport block of paging information transmitted via PDSCH.

FIG. 7 depicts a configuration example of a transport block of paging information transmitted via the PDSCH. The configuration of the transport block shown in FIG. 7 is prescribed in 3GPP TS36.331 and the like.

As shown in FIG. 7, the transport block includes a paging message (specifically, RRC message) and a padding bit. The padding bit is inserted according to the size of the paging message to be matched with the transport block size (TBS) prescribed as the standard specification of the 3GPP.

The paging message contains a list of paging records. Such a list can be constituted by a plurality of the paging records, and corresponds to a plurality of the user devices 300. Accordingly, the paging can be performed on the plurality of the user devices 300 collectively and simultaneously.

The paging record contains information such as an identifier of the user device 300 (UEID), and a domain (e.g., circuit switching (CS) and packet switching (PS)). S-TMSI (SAE-Temporary Mobile Subscriber Identity), IMSI (International Mobile Subscriber Identity), and the like can be used as the identifier of the user device 300.

(3.2.1) Example 1

Several formats can be considered with respect to which part of the transport block of the paging information shown in FIG. 7 shall be notified from the central aggregation device 210 to the remote device 260.

For example, the transport block (TB) of the paging information in itself can be notified from the central aggregation device 210 to the remote device 260. Specifically, the central aggregation device 210 can notify to the remote device 260 a resource location, a transmission format of the PDSCH, and a transport block of the paging information in itself for transmitting the paging message.

In this case, the remote device 260 performs processing such as encoding and the RF conversion of the contents of that particular transport block and transmits the paging message to the user device 300.

The resource location and the transmission format of the PDSCH can specifically include the following parameters:
 The number of OFDM symbols used for a control channel (PDCCH and the like)
 Assignment information (resource location) of a resource block (RB)
 Modulation method
 Transport block size (TBS)
 RNTI (Radio Network Temporary Identity)
 Repetition information
 Transmission power (3.2.2) Example 2

Alternatively, each information element in the paging message can be notified from the central aggregation device 210 to the remote device 260. Specifically, the central aggregation device 210 may notify to the remote device 260 the resource location and the transmission format of the PDSCH, and information elements (see FIG. 7) in the paging message for transmitting the paging message separately. The central aggregation device 210 can group a plurality of information elements and notify them to the remote device 260.

In this case, based on the information notified by the central aggregation device 210, the remote device 260 performs processing such as the encoding and the RF conversion of the contents of that particular transport block after assembling a transport block of the paging information and transmits the paging message to the user device 300.

(3.2.3) Modification

A parameter determined uniquely based on the standard specification of the 3GPP or a parameter that always has the same value (e.g. contents of various headers) can be omitted from information to be notified from the central aggregation device 210 to the remote device 260. Alternatively, such a parameter can be notified beforehand at the time of setting of the remote device 260 and the like.

Moreover, for the resource location and the transmission format of the PDSCH, to transmit the PDCCH, it is allowable to use the information notified from the central aggregation device 210 to the remote device 260.

(3.3) Execution Operation of Random Access Procedure

Figure 8:
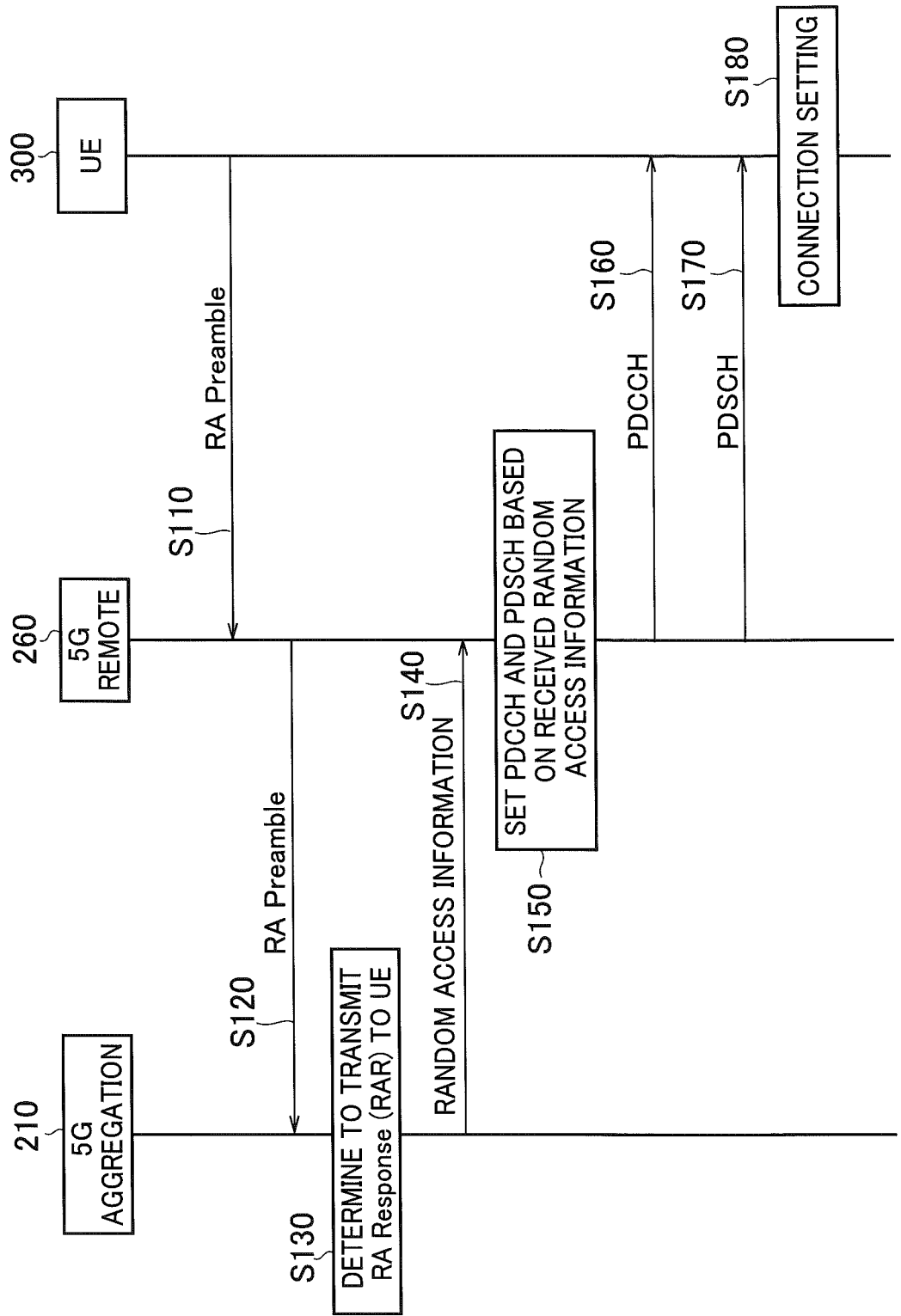
FIG. 8 depicts a sequence of the random access procedure performed by the central aggregation device 210, the remote device 260, and the user device 300.

FIG. 8 depicts a sequence of the random access procedure performed by the central aggregation device 210, the remote device 260, and the user device 300. As shown in FIG. 8, the user device 300 transmits the RA Preamble to the remote device 260 to start radio communication with the radio base station 200 (S110).

The remote device 260 transfers the RA Preamble received from the user device 300 to the central aggregation device 210 (S120).

The central aggregation device 210 determines to transmit the RA Response (RAR) to the user device 300 based on the RA Preamble transferred from the remote device 260 (S130). Specifically, the central aggregation device 210 determines the Temporary C-RNTI, the UL Grant, the transmission timing information (Timing Advance command), the assignment information of the radio resource, and the like.

The central aggregation device 210 transmits the random access information containing the contents of the RA Response to the remote device 260 (S140).

Based on the random access information received from the central aggregation device 210 the remote device 260 performs setting of the PDCCH and the PDSCH that are required in the random access procedure (S150). Furthermore, the remote device 260 transmits the PDCCH that contains information indicating existence of the RA Response to the user device 300 (S160). Moreover, the remote device 260 transmits the PDSCH containing the RA Response to the user device 300 (S170).

The user device 300 that received the PDCCH and the PDSCH performs connection (RRC connection) setting based on the received RA Response (S180).

Figure 9:
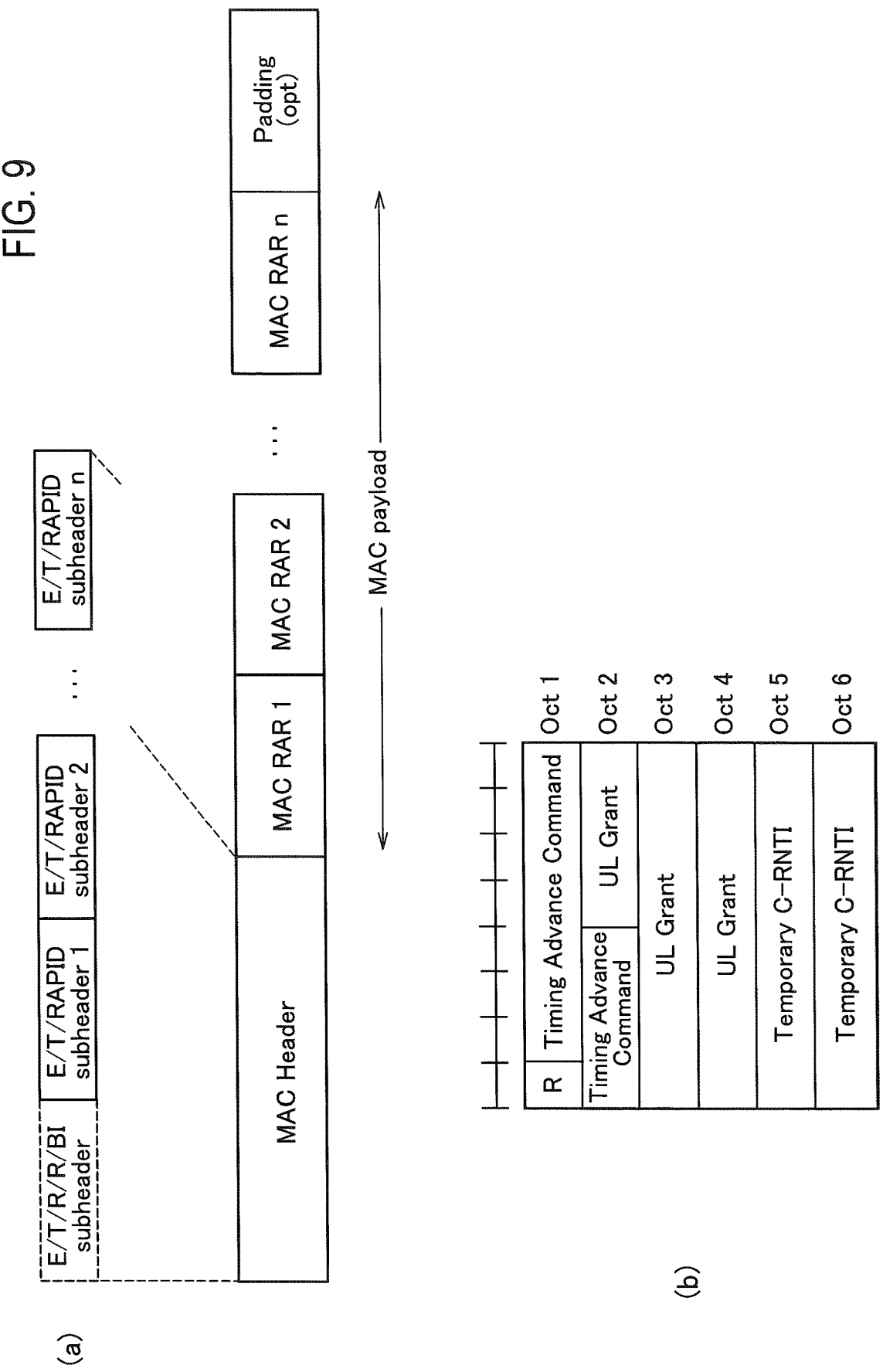
FIGS. 9(a) and 9(b) depict configuration examples of a transport block of random access information that is transmitted via the PDSCH.

FIGS. 9(a) and 9(b) show configuration examples of the transport block of the random access information transmitted via the PDSCH. Specifically, FIG. 9(a) shows a configuration of the transport block of the RA Response (RAR), and FIG. 9(b) shows a configuration of a payload part of the RA Response (RAR). The configuration of the transport block shown in FIGS. 9(a) and 9(b) has been prescribed in the 3GPP TS36.321 and the like.

As shown in FIG. 9(a), the transport block contains the MAC header, a plurality of MAC RAR (RA Response), and a padding bit. The padding bit is inserted according to the size of the MAC RAR (MAC payload) to be matched with the transport block size (TBS) prescribed as the standard specification of the 3GPP.

As shown in FIG. 9(b), the MAC RAR contains the Timing Advance command, the UL Grant, and the Temporary C-RNTI.

(3.3.1) Example 1

Several formats can be considered with respect to which part of the transport block of the random access information shown in FIG. 9(a) shall be notified from the central aggregation device 210 to the remote device 260.

For example, similar to the paging information explained above, the transport block (TB) of the random access information in itself can be notified from the central aggregation device 210 to the remote device 260. Specifically, the central aggregation device 210 can notify to the remote device 260 the resource location, the transmission format of the PDSCH, and a transport block of the random access information in itself for transmitting the RA Response.

In this case, the remote device 260 performs processing such as encoding and the RF conversion of the contents of that particular transport block and transmits the RA Response to the user device 300.

The resource location and the transmission format of the PDSCH can specifically include the following parameters:
The number of the OFDM symbols used for a control channel (PDCCH and the like)
Assignment information (resource location) of the resource block (RB)
Modulation method
Transport block size (TBS)
RNTI (Radio Network Temporary Identity)
Repetition information
Transmission power (3.3.2) Example 2

Alternatively, each information element (FIG. 9(b)) in the RA Response (MAC RAR) can be notified from the central aggregation device 210 to the remote device 260. The central aggregation device 210 can group a plurality of information elements and notify them to the remote device 260.

In this case, based on the information notified by the central aggregation device 210, the remote device 260 performs processing such as the encoding and the RF conversion of the contents of that particular transport block after assembling a transport block of the random access information and transmits the RA Response to the user device 300.

(3.3.3) Modification

The remote device 260 can calculate some of those parameters based on the information notified of for transmitting the PDCCH. Particularly, the remote device 260 can perform measurement and calculate a set value of the Timing Advance command and the transmission power control (TPC) command.

Specifically, in Example 1, the remote device 260 changes (substitutes) the parameter notified from the central aggregation device 210 based on the set value calculated by the remote device 260. In Example 2, the central aggregation device 210 omits to notify of the parameter the remote device 260.

A parameter determined uniquely based on the standard specification of the 3GPP or a parameter that always has the same value can be omitted from information to be notified from the central aggregation device 210 to the remote device 260. Alternatively, such a parameter can be notified beforehand at the time of setting of the remote device 260 and the like.

Furthermore, for the resource location and the transmission format of the PDSCH, to transmit the PDCCH, it is allowable to use the information notified from the central aggregation device 210 to the remote device 260.

(4) Effects and Advantages

According to the present embodiment, the following effects and advantages can be obtained. Specifically, the central aggregation device 210 includes the information transmitting unit 211 that transmits the paging information to the remote device 260. The remote device 260 sets a downlink physical channel (PDSCH) based on the paging information received from the central aggregation device 210 and performs the paging on the user device 300.

Furthermore, the central aggregation device 210 includes the information transmitting unit 211 that transmits the random access information to the remote device 260. Based on the random access information received from the central aggregation device 210 the remote device 260 sets the downlink physical channel (PDSCH) and transmits the random access response (RA Response) to the user device 300.

Therefore, even when a function of an upper layer such as the MAC scheduler and a function of a radio physical layer are mounted separately in the central aggregation device 210 and the remote device 260, an appropriate control on the user device 300, that is, the paging and the random access procedure, can be performed.

In the present embodiment, the information transmitting unit 211 can transmit to the remote device 260 as the paging information the transport block in itself of the paging information, or can transmit to the remote device 260 as the paging information the contents of the paging message contained in the transport block.

Similarly, the information transmitting unit 211 can transmit to the remote device 260 as the random access information the transport block in itself of the random access information, or can transmit to the remote device 260 as the random access information the contents of the information element constituting the transport block of the random access information.

A processing load on the central aggregation device 210 and the remote device 260 can be reduced by transmitting the transport block in itself of the paging information and the random access information. Moreover, the amount of information transmitted and received between the central aggregation device 210 and the remote device 260 can be reduced and required transmission band between the central aggregation device 210 and the remote device 260 can be reduced by transmitting the contents of the paging message or the contents of the information element constituting the transport block of the random access information.

(5) Other Embodiments

The present invention has been explained in detail by using the above mentioned embodiments; however, it is self-evident to a person skilled in the art that the present invention is not limited to the embodiments explained herein and that the embodiments can be modified or improved in various ways.

For example, in the above embodiments, the transport block in itself containing the padding bit was transmitted as the paging information D1 or the random access information D2 (see FIG. 5, FIGS. 7 and 9(a)); however, the padding bit does not need to be necessarily included. Particularly, when the number of the padding bits can be determined uniquely, it is allowable to transmit from the central aggregation device 210 to the remote device 260 the contents of the transport block other than the padding bit.

Moreover, in the above embodiments, both the paging information and the random access information are transmitted; however it is allowable that the radio communication system 10 transmits one of them.

Furthermore, though an explanation has been given in the above embodiments by using the terms prescribed in the 3GPP mainly, the terms can be replaced with some other terms. For example, as also mentioned in the above embodiments, the user device can be called a radio communication terminal, a mobile station, a user terminal, and the like. Moreover, the radio base station can be called a node, a radio communication device or system, and the like.

The sequences, flowcharts, and the like in the embodiments described above may be rearranged in order unless it causes a contradiction.

Note that the terms used in the descriptions of this specification and/or terms necessary to understand this specification may be replaced with terms having the same or similar meanings. For example, a channel and/or a symbol may be a signal, or a signal may be a message. In addition, the terms "system" and "network" may be used interchangeably.

Moreover, the above-described parameters and the like may be expressed by absolute values, by relative values from specified values, or by other associated information. For example, radio resources may be instructed by an index.

The radio base stations (the radio base stations 100 and 200, hereinafter referred as a base station) can accommodate one or more (for example, three) cells (also called sectors). When a base station has multiple cells, the entire coverage area of the base station can be divided into multiple smaller areas.

The term "cell" or "sector" means part or the whole of the coverage area provided by a base station and/or a subsystem of the base station that provide communication services in this coverage. Further, the terms "base station", "eNB", "cell", and "sector" can be used interchangeably in this specification. In some cases, a base station (BS) is also called terms such as a fixed station, a NodeB, an eNodeB (eNB), an access point, a femtocell, and a small cell.

The UE 300 is also called in some cases by those skilled in the art, a subscriber station, a mobile unit, a subscriber unit, a wireless unit, a remote unit, a mobile device, a wireless device, a wireless communication device, a remote device, a mobile subscriber station, an access terminal, a mobile terminal, a wireless terminal, a remote terminal, a handset, a user agent, a mobile client, a client, or some other suitable terms.

"The expression "based on" used in this specification does not mean "based only on" unless explicitly stated otherwise. In other words, the expression "based on" means both "based only on" and "based at least on".

In addition, the terms "including", "comprising", and other variations thereof are intended to be comprehensive as with "comprise". Moreover, the term "or" used in this specification or the scope of claims is intended not to be exclusive disjunction.

Any reference of the elements using names such as "first", "second", and the like used in this specification does not limit the amount or the order of these elements in general. These names can be used in this specification as a convenient way of discriminating two or more elements. Thus, referring to a first element and a second element does not mean that only the two elements can be employed in the specification or that the first element should precede the second element in some form.

In the entirety of this specification, for example, when articles such as a, an, and the in English are added in translation, these articles also mean to include plurality as long as the context does not clearly indicate the singularity.

The present invention can be expressed as below. According to one aspect of the present invention, a radio base station (radio base station 200) includes a remote device (remote device 260) and a central aggregation device (central aggregation device 210) and that performs radio communication with a user device (user device 300), wherein the central aggregation device includes an information transmitting unit (information transmitting unit 211) that transmits to the remote device paging information that is information used for performing paging on the user device, and the remote device includes an information receiving unit (information receiving unit 267) that receives the paging information; and a paging executing unit (paging executing unit 269) that sets a downlink physical channel based on the paging information received by the information receiving unit and performs the paging.

In the above aspect of the present invention, the information transmitting unit can transmit as the paging information a transport block in itself of the paging information transmitted via the downlink physical channel.

In the above aspect of the present invention, the information transmitting unit can transmit as the paging information contents of a paging message included in a transport block of the paging information transmitted via the downlink physical channel.

According to another aspect of the present invention, a radio base station includes a remote device and a central aggregation device and that performs radio communication with a user device, wherein the central aggregation device includes an information transmitting unit (information transmitting unit 211) that transmits to the remote device random access information that is information used for transmitting a random access response to the user device, and the remote device includes an information receiving unit that receives the random access information; and a response transmitting unit (RA procedure executing unit 271) that sets a downlink physical channel (PDSCH) based on the random access information received by the information receiving unit and transmits the random access response to the user device.

In the above aspect of the present invention, the information transmitting unit can transmit as the random access information a transport block in itself of the random access information transmitted via the downlink physical channel.

In the above aspect of the present invention, the information transmitting unit transmits as the random access information contents of an information element constituting a transport block of the random access information transmitted via the downlink physical channel.

According to still another aspect of the present invention, a communication control method implemented in a radio base station including a remote device and a central aggregation device and that performs radio communication with a user device includes transmitting including the central aggregation device transmitting to the remote device paging information that is information used for performing paging on the user device; and performing including the remote device setting a downlink physical channel based on the paging information received from the central aggregation device and performing the paging.

According to still another aspect of the present invention, a communication control method implemented in a radio base station including a remote device and a central aggregation device and that performs radio communication with a user device includes transmitting including the central aggregation device transmitting to the remote device random access information that is information used for transmitting a random access response to the user device; and performing including the remote device setting a downlink physical channel based on the random access information received from the central aggregation device and transmitting the random access response to the user device.

As described above, the details of the present invention have been disclosed by using the embodiment of the present invention. However, the description and drawings which constitute part of this disclosure should not be interpreted so as to limit the present invention. From this disclosure, various alternative embodiments, examples, and operation techniques will be easily apparent to a person skilled in the art.

The entire contents of Japanese Patent Application 2016-060449 (filed on Mar. 24, 2016) are incorporated in the description of the present application by reference.

INDUSTRIAL APPLICABILITY

According to the radio base station and the communication control method mentioned above, it is possible to realize appropriate control on the user device even when the function of the upper layer such as the MAC scheduler and the function of the radio physical layer are mounted separately.

EXPLANATION OF REFERENCE NUMERALS 10 radio communication system
20 core network
100 radio base station
110 central aggregation device
160 remote device
200 radio base station
210 central aggregation device
211 information transmitting unit
213 information receiving unit
215 paging controlling unit
217 RA procedure controlling unit
219 scheduler function unit
221 X2 IF unit
260 remote device
261 radio communication unit 263 information acquiring unit
265 information transmitting unit
267 information receiving unit
269 paging executing unit
271 RA procedure executing unit
300 user device
D1 paging information
D2 random access information

The invention claimed is:

1. A radio base station comprising: a remote device and a central aggregation device, wherein the radio base station performs radio communication with a user device,
wherein
the central aggregation device includes:
a paging control unit that generates paging information for controlling paging performed to the user device based on a paging request; and
an information transmitting unit that transmits to the remote device the paging information generated by the paging control unit, and
the remote device includes:
an information receiving unit that receives the paging information; and
a paging executing unit that performs the paging based on the paging information received by the information receiving unit,
wherein the central aggregation device is not a mobility management entity (MME), and
wherein the remote device includes a radio physical layer.

2. The radio base station as claimed in claim 1, wherein the information transmitting unit transmits as the paging information a transport block in itself of the paging information transmitted via a downlink physical channel.

3. The radio base station as claimed in claim 1, wherein the information transmitting unit transmits as the paging information contents of a paging message included in a transport block of the paging information transmitted via a downlink physical channel.

4. A communication control method implemented in a radio base station including a remote device and a central aggregation device and that performs radio communication with a user device, the communication control method comprising:
generating, by the central aggregation device, paging information for controlling paging performed to the user device based on paging request;
transmitting, by the central aggregation device to the remote device, the generated paging information; and
performing the paging based on the paging information received from the central aggregation device,
wherein the central aggregation device is not a mobility management entity (MME), and
wherein the remote device includes a radio physical layer.

* * * * *